United States Patent [19]
Kasboske

[11] Patent Number: 6,123,441
[45] Date of Patent: *Sep. 26, 2000

[54] MODULAR LIGHTING UNIT

[76] Inventor: George C. Kasboske, 2820 N. Whipple, Chicago, Ill. 60618

[ * ] Notice: This patent issued on a continued prosecution application filed under 37 CFR 1.53(d), and is subject to the twenty year patent term provisions of 35 U.S.C. 154(a)(2).

[21] Appl. No.: 08/540,930

[22] Filed: Oct. 11, 1995

Related U.S. Application Data

[63] Continuation of application No. 08/145,819, Nov. 2, 1993, abandoned, which is a continuation-in-part of application No. 07/938,465, Aug. 28, 1992, Pat. No. Des. 349,168.

[51] Int. Cl.$^7$ ...................................................... B60Q 1/00
[52] U.S. Cl. .......................... 362/543; 362/549; 362/249
[58] Field of Search .................................. 362/362, 83.3, 362/74, 370, 432, 457, 368, 460, 485, 543, 549, 249; 248/224.51, 224.41, 307, 225.11

[56] References Cited

U.S. PATENT DOCUMENTS

| | | | |
|---|---|---|---|
| D. 107,334 | 12/1937 | Hollins et al. | D26/30 |
| D. 115,802 | 7/1939 | Soderberg | D26/30 |
| D. 221,680 | 8/1971 | McReynolds | D26/24 |
| D. 298,656 | 11/1988 | Compton | D26/24 |
| 661,986 | 11/1900 | Heizer | 248/224.1 |
| 2,018,874 | 10/1935 | Reitherman et al. | 340/475 |
| 2,483,615 | 10/1949 | Benson | 248/224.1 |
| 2,785,292 | 3/1957 | Walleroth | 248/225.1 |
| 3,484,600 | 12/1969 | Fradette | 362/485 |
| 4,586,116 | 4/1986 | Kasboske | 362/61 |
| 4,972,301 | 11/1990 | Kasboske | 362/61 |
| 5,146,392 | 9/1992 | Kasboske | 362/362 |

*Primary Examiner*—Ira. S. Lazaras
*Assistant Examiner*—Sara Clarke
*Attorney, Agent, or Firm*—Wood, Phillips, VanSanten, Clark & Mortimer

[57] ABSTRACT

A modular lighting unit with a case having a front and back and a peripheral wall extending around a light chamber. A lens is mounted to the case. A reflector in the light chamber directs light from a source forwardly through the lens. The peripheral wall is defined at least partially by an exposed surface having a first portion that is other than the flat surface extending either fully horizontally or fully vertically. Structure is provided on the exposed surface portion for attaching another modular lighting unit to the case.

27 Claims, 4 Drawing Sheets

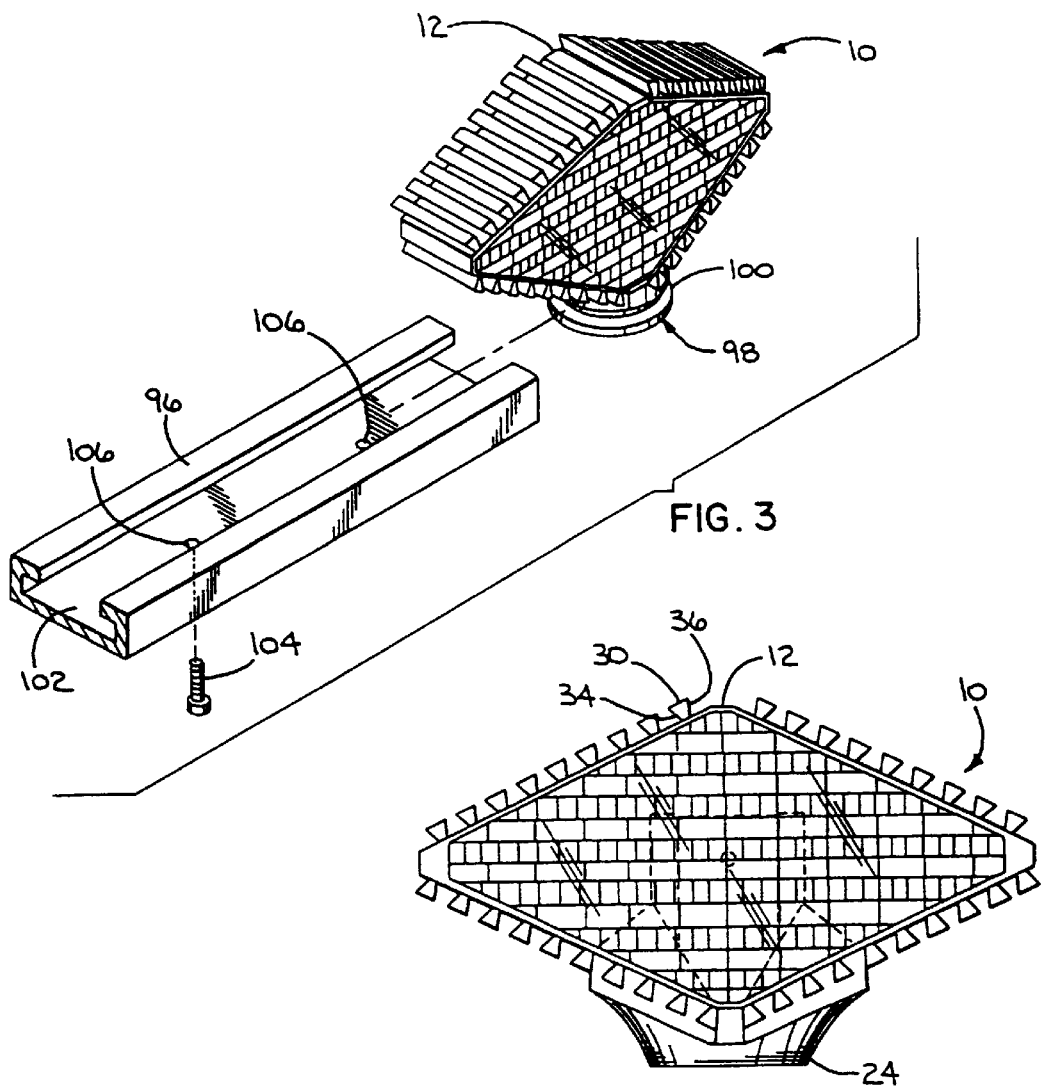
FIG. 3
FIG. 4
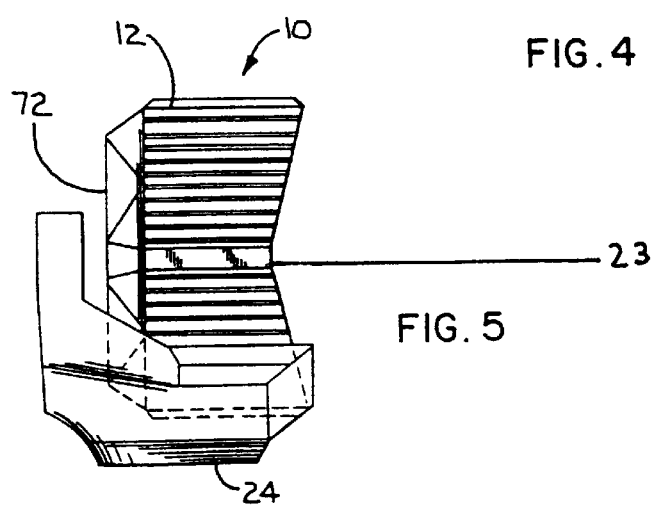
FIG. 5

MODULAR LIGHTING UNIT

CROSS-REFERENCE

This is a continuation of Ser. No. 08/145,819 filed Nov. 2, 1993 abandoned, and a continuation-in-part of my application Ser. No. 07/938,465, filed Aug. 28, 1992, now Des. No. 349,168, entitled "Vehicle Lamp".

BACKGROUND OF THE INVENTION

1. Field of the Invention

This invention relates to lighting equipment and, more particularly, to a modular lighting unit that is particularly suitable for use on on- and off-road vehicles to serve as at least one of a headlight, turn signal, tail light, running light, brake light, etc. on the vehicle.

2. Background Art

It is known to place several different types of lights on on- and off-road vehicles. On the top of truck cabs, running lights and spot lights are commonly seen. This latter type of light is commonly mounted upon a bracket that spans laterally across the top of the vehicle cab. A plurality of lights are mounted in spaced relationship and project upwardly from the bracket. The individual lights, which may be relatively heavy, are held in place principally by a depending stem that acts as a pedestal. It is difficult with such a construction to maintain the lights in a stable position and in proper alignment. With these lights on off-road vehicles, vibrations and shock due to rough terrain often tend to work the lights loose from their mounting. Even if the lights do not work loose, there is a tendency of the lights to rattle as they flex about the pedestal-type mount.

In some constructions, if the light becomes misaligned, it must be removed to allow the mounting stem to be reshaped. The light must then be re-mounted.

A further problem with the above structure is that it is relatively limited with respect to the number and arrangement of lights on the bracket. Sufficient spacing must be left between adjacent lights so that the lights do not contact each other as when they flex with the vehicle in operation. At the same time, the lights must all be mounted at the same vertical height, as dictated by the mounting bracket.

Still further, most of the brackets and mounting structures for the lights are made from metal. Consequently, as these parts rust or corrode, it becomes more difficult, and at times impossible, to disassemble and adjust the lights.

Other lights mounted on vehicles, such as those used as headlights, running lights, tail lights, turn signal lights, running board lights, brake lights, etc., have the same problems as discussed above.

Because of the constraints introduced by conventional mounting systems, the cases for the above types of lights are usually made relatively simple in shape. That is, in most instances, the cases are square or rectangular. As a result, most of these conventional lights are usually unimaginative in terms of their appearance.

The inventor herein invented a system for mounting modular lighting units, which invention is the subject of U.S. Pat. No. 4,972,301. This invention overcomes some of the problems identified above.

SUMMARY OF THE INVENTION

The present invention is specifically directed to overcoming the above-enumerated problems in a novel and simple manner.

In one form of the invention, a modular lighting unit is provided with a case having a front and back and a peripheral wall extending around a light chamber. A lens is mounted to the case. A reflector in the light chamber directs light from a source forwardly through the lens. The peripheral wall is defined at least partially by an exposed surface having a first portion that is other than a flat surface extending either fully horizontally or fully vertically. Structure is provided on the exposed surface portion for attaching another modular lighting unit to the case.

In one form, the exposed surface is flat.

The attaching structure can take a number of different forms. In one form, the attaching structure includes a plurality of ribs and recesses. The lighting units can be permanently or removably attached.

The invention also contemplates the combination of the above structure with a mounting base to which the case can be connected.

The invention further contemplates the combination of the above structure with a guide rail to be attached to a support. The mounting base cooperates with the guide rail to allow the mounting base to be maintained in a plurality of different positions relative to the guide rail.

In one form, the support is one of an on- and off-road vehicle. The lighting unit can function as one of a headlight, a turn signal, a tail light, a running lights, a brake light, etc. on the vehicle.

To assist adjustment of the lighting unit, levelling structure can be provided for adjusting the attitude of the mounting base relative to a support for the mounting base.

The invention contemplates the combination of a first modular lighting unit with a second modular lighting unit, with the first and second modular lighting units being substantially the same. The second lighting unit has a second surface portion that can be attached to the first surface portion on the first unit. In one form, the first and second surface portions are each flat and angled so that with the first and second surface portions abutted to each other, the first and second lighting units have the same orientation.

While the peripheral wall surface of the lighting units can take a number of different shapes, in one desirable form, the peripheral wall surface has a diamond shape.

A third modular lighting unit, similar to the first and second lighting units, can be provided. The first lighting unit can be constructed to be attached to the third lighting unit.

In one form, only two of the three modular lighting units are connected to a support therefor, with the other module being supported by the support-engaging modules. The third module can be supported in cantilever fashion from one or both of the other two modules.

A fourth lighting unit can be provided for connection to each of the second and third modular lighting units.

With the inventive structure, a tremendous amount of versatility is afforded. The individual modules can be stacked and interlocked to provide a highly stable system with an infinite number of different overall shapes and designs being possible.

A light source can be provided as part of the modular lighting unit.

In another form of the invention, a modular lighting unit is provided having a case and a light source mounted to the case. The case has a peripheral wall defined at least partially by an exposed surface having a first portion that is other than a flat surface extending fully horizontally or fully vertically, with structure on the exposed surface portion being provided for attaching another modular lighting unit to the case.

DETAILED DESCRIPTION OF THE DRAWINGS

FIG. 3 is a perspective view of the modular lighting unit on the mounting base situated for engagement with a guide rail to which the lighting unit can be attached in a plurality of different positions;

FIG. 4 is a front elevation view of the modular lighting unit assembled to the mounting base;

FIG. 5 is a side elevation view of the modular lighting unit;

DETAILED DESCRIPTION OF THE DRAWINGS

Figures 1, 2:
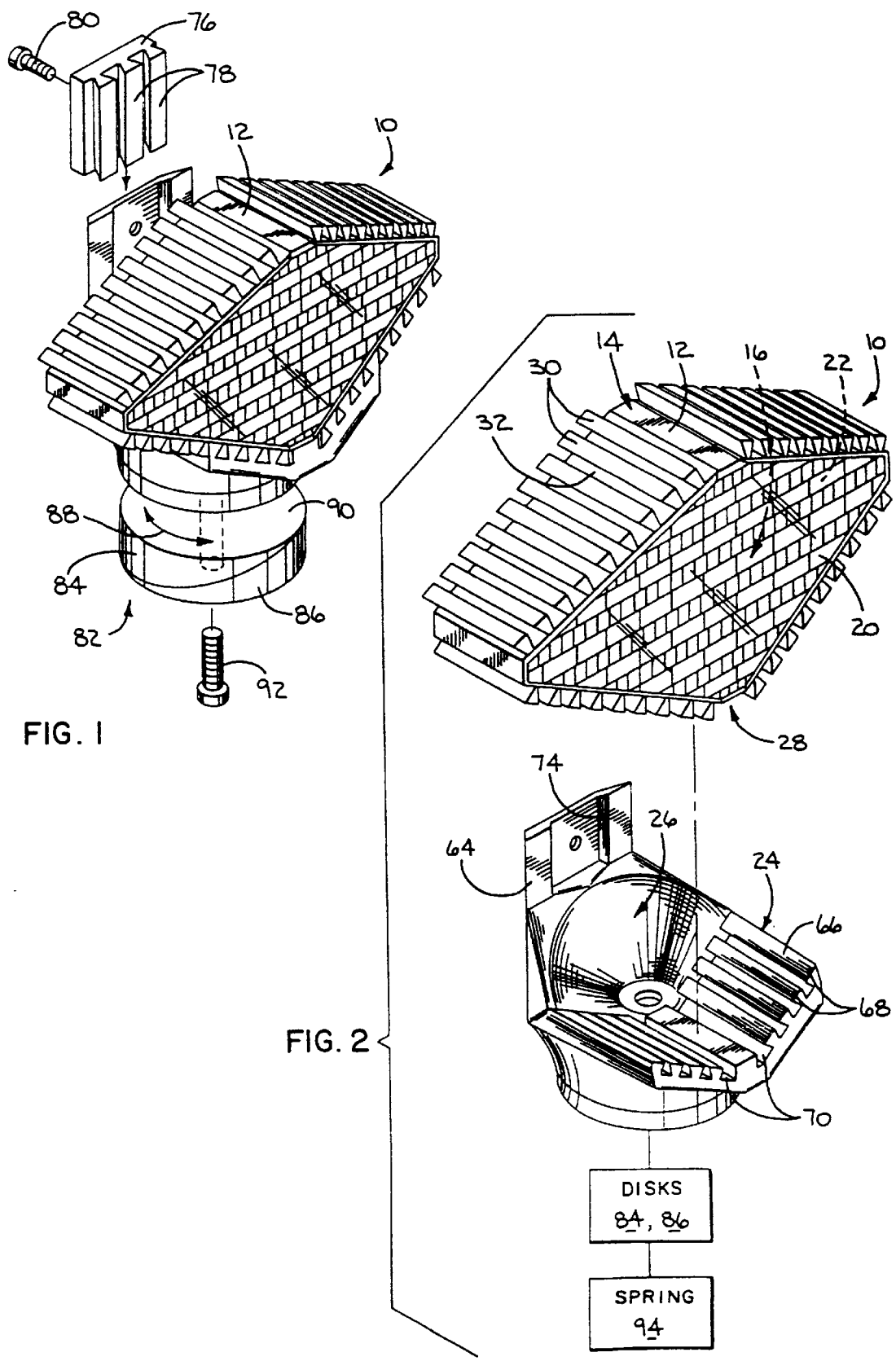
FIG. 1 is a perspective view of a modular lighting unit according to the present invention assembled to a mounting base.
FIG. 2 is an exploded perspective view of the modular lighting unit and mounting base.

In FIGS. 1–12, a modular lighting unit, according to the present invention, is shown at 10. The lighting unit 10 has a case 12 with a peripheral wall 14 extending around a light chamber 16 within which a light source 18 (FIG. 8) resides. Light from the source 18 projects forwardly through a striped lens 20 at the forward portion of the case 12. A suitable construction for the lens 20 is described in my U.S. Pat. No. 4,586,116. However, it is not necessary that the lens 20 be other than clear or translucent. In fact, the lens 20 could be altogether eliminated.

Light projecting rearwardly from the light source 18 is redirected forwardly by a reflector 22 at the rear of the case 12. The reflector 22 is likewise optional. The light pattern is centered on a fore-and-aft line 23 (FIG. 5) extending through the light source 18.

A mounting base 24 defines a cradle at 26 for the bottom 28 of the module 10. The mounting base 24 provides a pedestal/foundation for the module 10 upon a support 28, as shown generically at 29 in FIGS. 6 and 7.

The case 12 has peripherally spaced, elongate ribs 30 extending in a fore and aft direction, with there being recesses 32 defined between adjacent ribs 30. Each rib 30 has oppositely facing side surfaces 34, 36 which diverge away from the case 12. The recesses 32 have a complementary shape to accept a rib on a like module 10. The ribs 30 and recesses 32 are spaced equidistantly so as to mesh with ribs 30 and recesses 32 on an adjoining, like module 10 in a plurality of different relative positions.

The wall 14 on each case 12 has four flat surface portions 38, 40, 42 and 44 which can be flushly abutted to any of the flat surfaces 38, 40, 42, 44 on a like module 10 to be joined thereto. In one preferred form, the surfaces 38, 40, 42, 44 cooperatively define a diamond shape.

Figure 8:
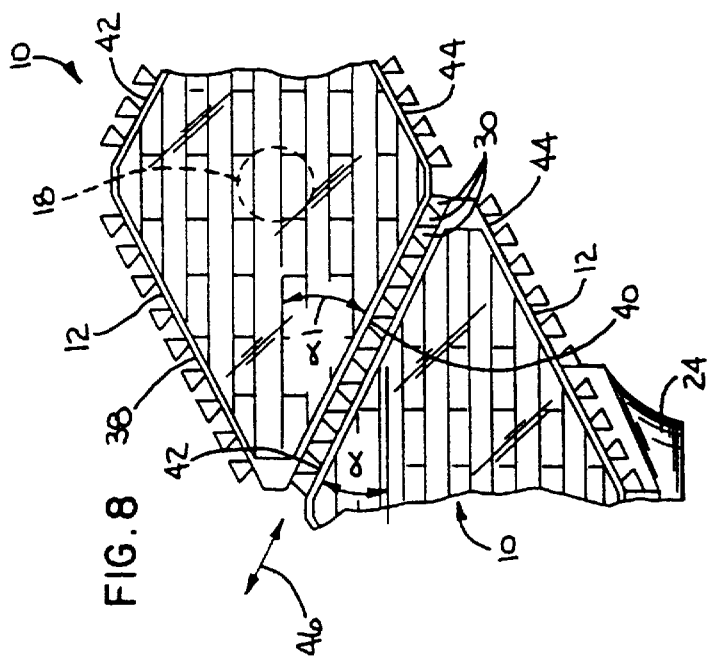
FIG. 8 is an enlarged, fragmentary, front elevation view of the connection between two of the modular lighting units.

While the peripheral wall 14 could have other shapes, it is desirable that at least one of the flat surfaces 38, 40, 42, 44 extends other than fully vertically or horizontally to facilitate connection to another module 10. As seen most clearly in FIG. 8, the angle $\alpha$ of the surface 42 on the lower module 10 is chosen to be equal to the angle $\alpha1$ of the surface 40 on the superjacent module 10 so that with the modules 10 stacked as shown in FIG. 8, the two modules 10 have the same orientation, i.e with one upright, the other module attached thereto is upright. As a result, the upper module 10 is held in cantilever fashion from the wall surface 42 on the lower module 10 through the meshing ribs 30. Since the ribs 30 are spaced equidistantly along the surfaces 40, 42, the two modules 10 can be connected in a plurality of different positions along the line of the double-headed arrow 46.

The arrangement of the ribs 30 and recesses 32 is such that the modules 10 that are to be joined can be relatively positioned, one in front of the other, and moved towards and against each other in a fore and aft direction to mesh the ribs 30. Once the ribs 30 on adjacent modules 10 are in mesh, a screw or other type of wedge 48 (FIG. 12) can be directed into a bore 50 extending lengthwise into or through one of the ribs 30 to progressively effect a lateral expansion thereof, as indicated by the bowed side surface 34 shown in phantom lines in FIG. 12. This effectively locks adjacent ribs 30 on the joined modules 10 to prevent inadvertent separation of the joined modules 10.

Figure 6:
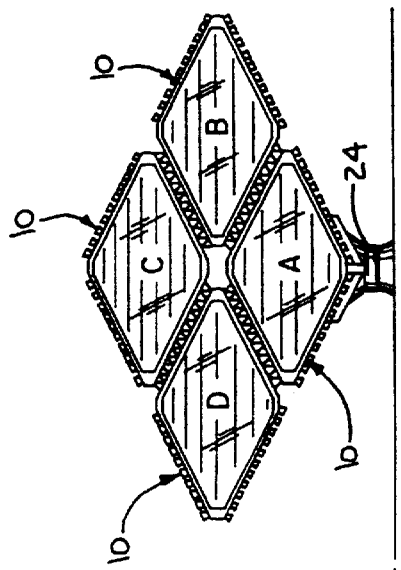
FIG. 6 is a front elevation view of four modular lighting units assembled in one configuration around a single mounting base.

With the above described structure, the modules 10 can be rigidly meshed in clusters in a variety of different attractive and functional shapes. In FIG. 6, four modules, designated A, B, C and D, are shown assembled together to define a larger diamond shape. The module A is carried on a mounting base 24 and connected to modules B and D. The uppermost module C is connected to both the modules B and D. This structure affords a self-rigidifying arrangement by reason of the interlocking of the modules A, B, C and D. Additional modules can be stacked upon the modules B, C, D and each other to construct a further desired shape.

Figure 7:
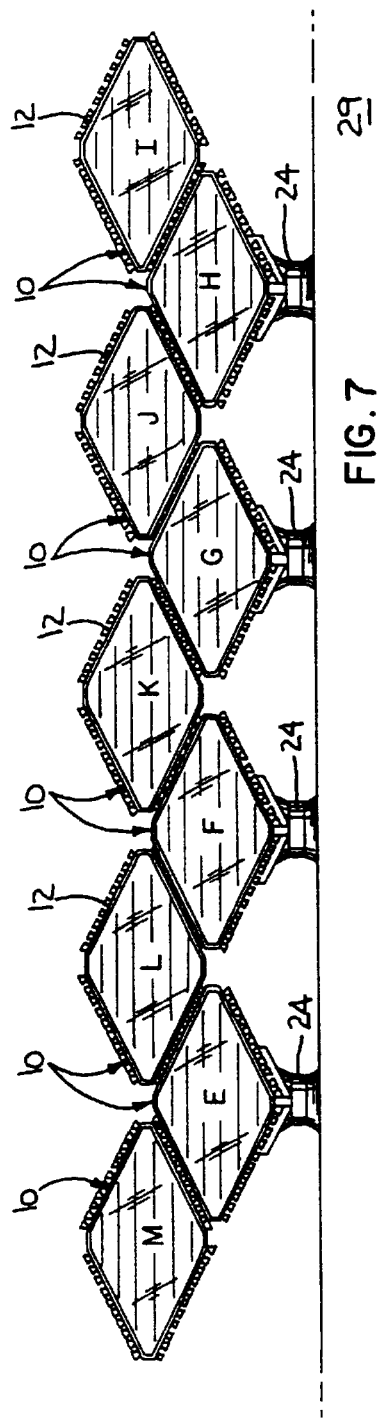
FIG. 7 is a front elevation view showing nine modular lighting units connected together in another configuration on a plurality of mounting bases.
Figure 9:
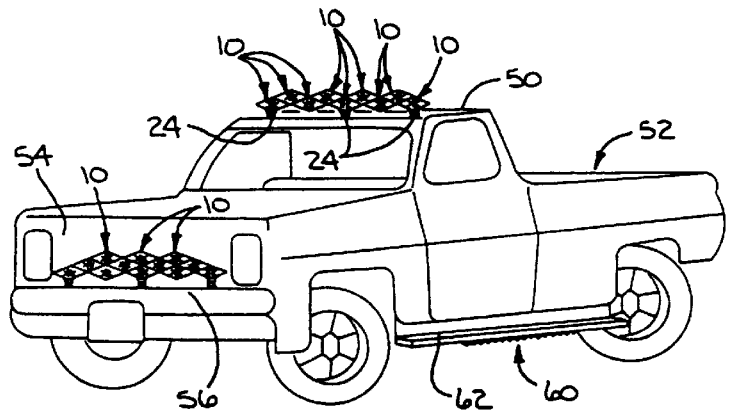
FIG. 9 is a perspective view of one type of vehicle with modular lighting units according to the present invention mounted thereon.
Figure 12:
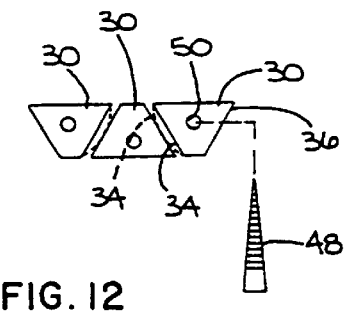
FIG. 12 is an enlarged, fragmentary, front elevation view of a plurality of ribs and recesses on joined modular lighting units.

In FIG. 7, nine modules are shown, lettered E–M, arranged in a different configuration. The lowermost modules E, F, G and H are each received in a mounting base 24 which mounting bases 24 are fixed to an underlying support 30. The end modules M, I are each supported in cantilever fashion from a single module E, H, respectively. The other modules L, K, J are each connected to two modules. This interlocking arrangement permits a reinforced, sturdy assembly of modules 10 across a substantial width, as upon the cab 50 of a pickup truck 52, shown in FIG. 9. The support 30 can be the vehicle 52 itself or a bracket which is attached to the vehicle 52. In FIG. 9, the mounting bases 24 are attached directly to the vehicle 52.

A similar arrangement of modules 10 is shown in front of the grill 54 on the front of the vehicle 52 on the bumper 56. The modules 10 are stacked one layer higher than the arrangement shown in FIG. 7.

Figure 10:
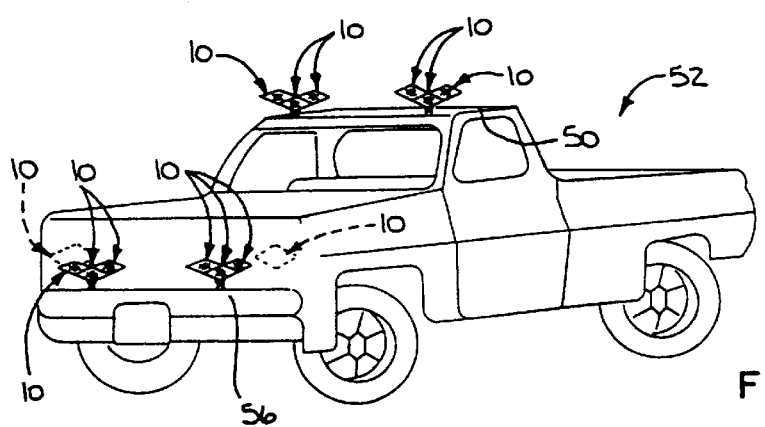
FIG. 10 is a view as in FIG. 9 with the modular lighting units mounted on the vehicle in a different configuration.

In FIG. 10, individual clusters of three are shown mounted upon the cab 50 and bumper 56 on the vehicle 52.

Figure 11:
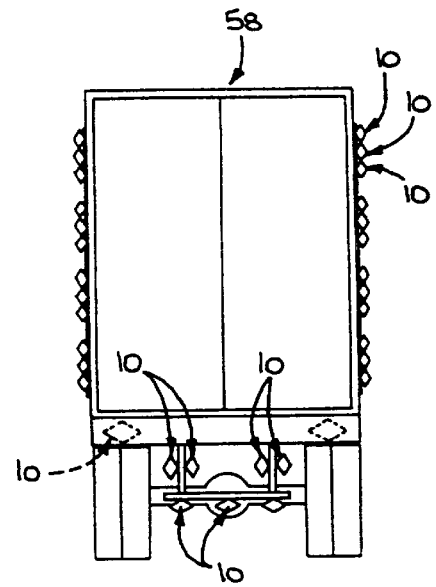
FIG. 11 is a rear elevation view of a semi-truck/trailer with modular lighting units thereon.

The joined modules 10 can be downsized and used as running lights, as on a semi-truck/trailer, shown at 58 in FIG. 11. In FIG. 11, the single modules 10 are shown to be used as brake and turn signal lights for the semi-truck/trailer 58.

A further downsized version of the module 10 is shown at 60 in FIG. 9 along the edge of a running board 62 on the vehicle 52.

The modules 10 can be simply joined like building blocks to produce an overall desired size and shape. The angular arrangement of the surfaces 38, 40, 42, 44 facilitates stacking, provides a rigid cantilevered support between adjacent modules 10, provides a rigid connection between two joined modules, and allows unique shapes to be created at the point of use by a consumer.

Further, the consumer can disassemble and re-assemble the modules 10 in a desired shape.

The ribbed arrangement of the case 12 also facilitates connection of the case 12 to the mounting base 24. The mounting base 24 is generally L-shaped with a vertically extending wall 64 and a horizontally extending wall 66. The wall 66 has ribs 68 and recesses 70 corresponding to the ribs 30 and recesses 32 in terms of size and spacing. The horizontal wall 66 has a V shape corresponding to the bottom wall of the case 12. The module 10 can thus be press fit from front to rear into operative engagement with the mounting base 24. In that operative position, the rear wall 72 of the case resides in close proximity to the vertically extending wall 64 on the mounting base 24.

The mounting base 24 has an undercut 74 to accept a mounting plate 76 having ribs 78 which can be slid vertically into mesh with ribs (not shown) on the rear wall 72 of the case 12. A fastener, in the form of a screw 80, can be directed through the wall 64, the plate 76 and into the case rear wall 72 to prevent separation of the module 10 from the mounting base 24. Disassembly of the module 10 from the mounting base 24 can be accomplished by reversing the above steps.

A further aspect of the invention is the provision of a levelling means at 82 by which the attitude of the combined module 10 and mounting base 24 can be altered relative to the support 30 on which they are carried. A pair of sloped disks 84, 86 are placed in overlying relationship. In one relative position, the disks 84, 86 cooperatively define a uniform thickness. By relatively rotating the disks, as indicated by the arrow 88, the thickened and thin portions of the disk 84, 86 reside in different relationships, thereby causing the upper surface 90 of the disk 84, which bears on the mounting base 24, to vary in attitude. A mounting bolt 92 can be directed through the disks 84, 86 and into the mounting base 24 to fix the relative positions thereof.

An optional spring 94 can be used to biasably capture the disks 84, 86 against the mounting base 24 so that the relative positions of the disks 84, 86 and mounting base 24 are frictionally maintained before the bolt 92 is tightened to positively fix this relationship.

Another aspect of the invention is the provision of a mounting/guide rail 96 to accept a modified form of mounting base, as shown in FIG. 3 at 98. The mounting base 98 has an enlarged disk 100 which fits in a slot 102 on the rail 96 to allow the disk 100, and module 10 associated therewith, to be slid along the rail 96. A bolt 104 can be directed through any of a number of bores 106 in the rail 96 to extend into the mounting base 98 to fix the position of the mounting base 98 relative to the rail 96 as desired.

The foregoing disclosure of specific embodiments is intended to be illustrative of the broad concepts comprehended by the invention.

What is claimed is:

1. A lighting unit assembly comprising:
    a plurality of modular lighting units including first, second, and third modular lighting units, the first and second lighting units each having:
        a case having a front and back and a peripheral wall extending around a light chamber; and
        a reflector in said light chamber for directing light from a source forwardly from said case in a pattern centered on a fore-and-aft line,
    at least one of the first and second lighting units being mountable to a mounting base in a first position such that with the at least one of the first and second lighting units in the first position the fore-and-aft line associated with the at least one of the first and second lighting units is horizontally oriented,
    wherein the peripheral wall on the at least one of the first and second lighting units is defined at least partially by an exposed surface and with the at least one of the first and second lighting units in the first position the exposed surface thereof has a portion that is other than a flat surface extending either fully horizontally or fully vertically,
    the exposed surface portion of the at least one of the first and second lighting units joined to the other of the first and second modular lighting units,
    at least part of the portion of the exposed surface of the at least one of the first and second lighting units facing upwardly, there being a substantial portion of the other of the first and second lighting units that vertically overlies and bears against the at least part of the portion of the exposed surface of the at least one of the first and second lighting units,
    the third lighting unit being connected directly to each of the first and second modular lighting units.

2. The lighting unit assembly according to claim 1 wherein the exposed surface portion is flat.

3. The lighting unit assembly according to claim 1 wherein the first and second lighting units are connected to each other through a plurality of cooperating ribs and recesses.

4. The lighting unit assembly according to claim 1 in combination with a mounting base to which the lighting unit assembly is connected.

5. The lighting unit assembly according to claim 4 in combination with a guide rail to be attached to a support and the mounting base can be maintained in a plurality of different positions relative to the guide rail.

6. The lighting unit assembly according to claim 5 in combination with a support for the guide rail, said support comprising one of an on- and off-road vehicle.

7. The lighting unit assembly according to claim 1 wherein the exposed surface of the peripheral wall defines a diamond shape.

8. The lighting unit assembly according to claim 1 wherein the first and second lighting units have substantially the same shape, the peripheral wall of both of the first and second lighting units is defined at least partially by an exposed surface portion that is flat and angled relative to horizontal with the at least one of the first and second lighting units in the first position and the other of the first and second lighting units attached to the one of the first and second lighting units and the at least one of the first and second lighting units has a first orientation so that with the surface portions of the first and second lighting units abutted to each other the other of the first and second lighting units is arranged in a second orientation substantially the same as the first orientation.

9. The lighting unit assembly according to claim 1 wherein the at least one of the first and second modular lighting units is removably attached to the other of the first and second modular lighting units.

10. The lighting unit assembly according to claim 1 in combination with a light source on the case.

11. The lighting unit assembly according to claim 1 wherein the reflector has a diamond shape.

12. The lighting assembly according to claim 1 wherein said peripheral wall of the at least one modular lighting unit defines a shape as viewed from the front of the at least one modular lighting unit that is other than one of a rectangle and square with the at least one of the first and second lighting units in the first position.

13. A lighting unit assembly comprising:
a plurality of modular lighting units including a first and a second modular lighting unit each having:
 a) a case having a front and back and a peripheral wall extending around a light chamber; and
 b) a reflector in said light chamber for directing light from a source forwardly from said case in a pattern centered on a fore-and-aft line;
first means for mounting at least one of the first and second lighting units to a mounting base in a first position such that with the at least one of the first and second lighting units in the first position the fore-and-aft line associated with the at least one of the first and second lighting units is horizontally oriented,
wherein the peripheral wall on the at least one of the first and second lighting units is defined at least Partially by an exposed surface and with the at least one of the first and second lighting units in the first position the exposed surface thereof has a Portion that is other than a flat surface extending either fully horizontally or fully vertically;
means on the exposed surface portion of the at least one of the first and second lighting units and on the other of the first and second modular lighting units for attaching the first and the second modular lighting units to each other,
at least part of the portion of the exposed surface of the at least one of the first and second lighting units facing upwardly, there being a substantial portion of the other of the first and second lighting units that vertically overlies and bears against the at least part of the portion of the exposed surface of the at least one of the first and second lighting units, there being another portion of the other of the first and second lighting units that projects horizontally in cantilever fashion from the at least one of the first and second lighting units;
a mounting base; and
means for removably connecting the at least one of the cases to the mounting base,
wherein the mounting base includes means for attaching the mounting base to a support and further including levelling means for adjusting the attitude of the mounting base relative to a support for the mounting base.

14. A lighting unit assembly comprising:
a plurality of modular lighting units including a first and a second modular lighting unit each having:
 a case having a front and back and a peripheral wall extending around a light chamber;
 a reflector in said light chamber for directing light from a source forwardly from said case in a pattern centered on a fore-and-aft line;
first means for mounting at least one of the first and second lighting units to a mounting base in a first position such that with the at least one of the first and second lighting units in the first position the fore-and-aft line associated with the at least one of the first and second lighting units is horizontally oriented,
wherein the peripheral wall on the at least one of the first and second lighting units is defined at least partially by an exposed surface and with the at least one of the first and second lighting units in the first position the exposed surface thereof has a portion that is other than a flat surface extending either fully horizontally or fully vertically; and
means on the exposed surface portion of the at least one of the first and second lighting units and on the other of the first and second modular lighting units for attaching the first and the second modular lighting units to each other,
wherein there are second means on the exposed surface of the at least one of the first and second modular lighting units for attaching a third one of the plurality of modular lighting units to the at least one of the first and second modular lighting units, there further being means other than the at least one of the first and second modular lighting units for attaching the third modular lighting unit to the other of the first and second modular lighting units.

15. The modular lighting unit according to claim 14 wherein at least one of a) the means for attaching the exposed surface portion of the first modular lighting unit to the second modular lighting unit and b) the second attaching means comprises a plurality of cooperating ribs and recesses.

16. The modular lighting unit according to claim 14 including means for attaching only two of the three modular lighting units to a support therefor.

17. The lighting unit assembly according to claim 14 including a fourth modular lighting unit and means on the fourth modular lighting unit for attaching the fourth modular lighting unit to at least two of the other modular lighting units.

18. A lighting unit assembly comprising: first, second, and third modular lighting units each comprising:
 a) a case having a front and back and a peripheral wall extending around a light chamber; and
 b) a light source in the light chamber for directing light forwardly from the case in a pattern centered in a fore-and-aft line which extends horizontally with the first and second lights in a mounting position on a horizontally extending, flat support for the lighting unit assembly,
wherein the peripheral wall on the first modular lighting unit has an exposed surface portion that is not a flat surface portion extending either parallel to the flat support or orthogonally to the flat support,
wherein the peripheral wall on the second modular lighting unit has an exposed surface portion that is attached to the exposed surface portion on the first modular lighting unit with the first and second modular lighting units each in the mounting position, and
the third modular lighting unit is attached directly to each of the first and second modular lighting units.

19. The lighting unit assembly according to claim 18 wherein the exposed surface portion on the second modular lighting unit is not a flat surface portion extending either parallel to the flat support or orthogonally to the flat support.

20. The lighting unit assembly according to claim 19 wherein the surface portions on the first and second modular lighting units are each flat and substantially parallel to each other with the first and second modular lighting units each in the mounting position.

21. The lighting unit assembly according to claim 19 wherein the peripheral wall on each of the first and second modular lighting units has an exposed external surface that is diamond shaped.

22. The lighting unit assembly according to claim 18 further comprising a first mounting base which is connectable to a support for the lighting unit assembly and upon which the first modular lighting unit is supported with the first modular lighting unit in the mounting position for the first modular lighting unit, a second mounting base which is connectable to a support for the lighting unit assembly the third modular lighting unit is attached to each of the first and second modular lighting units so as to be maintained in a mounting position on a flat support for the lighting unit assembly without connection of the third modular lighting unit directly to a support for the lighting unit assembly.

23. The lighting unit assembly according to claim 22 wherein the first modular lighting units is connectable to the first mounting base by moving the first modular lighting unit in a translatory path relative to the first mounting base.

24. The lighting unit assembly according to claim 22 wherein the first modular lighting unit is connectable to the first mounting base without the use of separate fasteners.

25. The lighting unit assembly according to claim 18 wherein the exposed surface portions on the first and second modular lighting units are attachable, each to the other, without the use of separate fasteners.

26. The lighting unit assembly according to claim 25 wherein there are a cooperating rib and recess on the exposed surface portion of the first and second modular lighting units through which the exposed surface portions on the first and second modular lighting units are attached to each other.

27. The lighting unit assembly according to claim 26 wherein the rib and recess are engagable by translating one of the first and second modular lighting units relative to the other of the first and second modular lighting units.

* * * * *